United States Patent [19]
Franchini

[11] 3,765,715
[45] Oct. 16, 1973

[54] REINFORCING STRUCTURAL ELEMENT FOR VEHICLE BODY

[75] Inventor: Enzo Franchini, Turin, Italy
[73] Assignee: Fiat Societa Per Azioni, Turin, Italy
[22] Filed: Nov. 24, 1971
[21] Appl. No.: 201,721

[30] Foreign Application Priority Data
Dec. 3, 1970 Italy.............................. 71032 A/70

[52] U.S. Cl. .............................................. 296/28 G
[51] Int. Cl............................................. B62d 27/02
[58] Field of Search .............. 296/28 R, 28 F, 28 G, 296/70; 280/106 R; 180/89 R, 90

[56] References Cited
UNITED STATES PATENTS
3,279,816  10/1966  Issigonis............................ 296/28 R
3,055,699   9/1962  May.............................. 180/89 R X
2,091,059   8/1937  Tjaarda................................ 180/90
2,100,561  11/1937  Kliesrath.......................... 280/106 R
2,131,184   9/1938  Kliesrath............................ 296/28 R
3,321,235   5/1967  Muller et al. ..................... 296/28 R FOREIGN PATENTS OR APPLICATIONS
728,111  10/1942  Germany.......................... 296/28 G
805,577  12/1958  Great Britain.................... 296/28 R Primary Examiner—Benjamin Hersh
Assistant Examiner—John A. Pekar
Attorney—Richard C. Sughrue et al.

[57] ABSTRACT

This invention provides a reinforcing structural element interconnecting existing structures at the floor level or rear wall of a vehicle body interior space and existing front transverse elements at the instrument panel or windshield base. The reinforcing element, which may be of box-or U-section, strengthens the body against longitudinal deformation in the event of a frontal collision.

3 Claims, 6 Drawing Figures

REINFORCING STRUCTURAL ELEMENT FOR VEHICLE BODY

BACKGROUND OF THE INVENTION

This invention relates to bodywork constructions for protecting the occupants of motor vehicles involved in collisions.

It is known that the body of a motor vehicle involved in a collision may become deformed in such a manner as to reduce the volume available to the vehicle occupants, who may find themselves constricted or even crushed between the interior walls of the vehicle body, notwithstanding the provision of adequate padding or other protective means. It has therefore been the practice to design the body of a vehicle so as to ensure that in the event of a collision the deformation of the body is lower than a certain maximum deformation so as to ensure adequate space for survival of the occupants.

An object of the present invention is to provide a reinforcing structural element for a vehicle body which is able to reduce longitudinal deformation of the interior space of the body in the event of a frontal collision, to ensure adequate survival space for the occupants.

Another object of the invention is to provide a structural element as aforesaid which is of simple and strong construction, easy to fit, and of low cost and weight.

A further object of the invention is to provide a structural element as aforesaid which does not reduce substantially the space available to occupants of the interior of the vehicle body and which does not obstruct the entry and egress of occupants.

SUMMARY OF THE INVENTION

The present invention accordingly provides a reinforcing structural element for a vehicle body which is capable of reducing the longitudinal deformation of the interior space of the body in the event of a frontal collision, said structural element being constituted by a longitudinal strut adapted to interconnect structural elements at the floor or rear wall of the interior space and existing transverse front structural elements located beneath the windshield and/or adjacent the instrument panel of the vehicle.

The structural element of the present invention results from a study of the effect of the position and configuration of the resistant structural elements of a vehicle body upon the resultant deformation of the body after a collision. In particular, it has been noted that the longitudinal tunnel on the floor of most motor car bodies is beneficial for the purpose of containing the longitudinal deformation of the body structures located at the floor level. Also advantageous for the purpose of containing the longitudinal deformation of the body at waist level is the provision of a strut which resists buckling loads upon impact and which prevents or limits recoil of the bulkhead which separates the interior of the passenger compartment from the front compartment, as well as the transverse struts beneath the windscreen and behind the instrument panel.

BRIEF DESCRIPTION OF THE DRAWINGS

The invention will be further understood from the detailed description which follows, by way of non-limiting example, with reference to the accompanying drawings, in which.

DETAILED DESCRIPTION OF THE DRAWINGS

Figure 1:
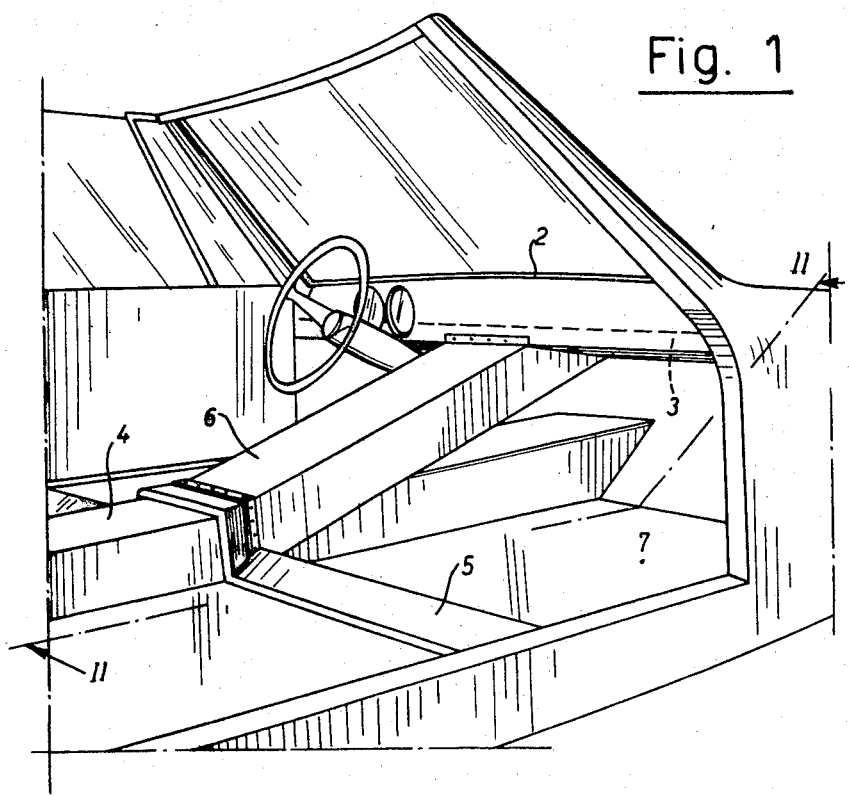
FIG. 1 is a diagrammatic perspective view of the interior of a car the body of which is provided with a reinforcing structural element according to one embodiment of the invention.

Referring to the drawings, part of a motor car body is shown including a bulkhead 1 which separates the passenger compartment from the front space of the vehicle, a transverse strut 2 beneath the windshield and a transverse strut 3 which supports the instrument panel from behind. A tunnel 4 extends longitudinally along the floor 7 of the passenger compartment and a crosspiece 5 extends transversely over the floor 7 and over the tunnel 4 in the region of the front seats (not shown). The bulkhead 1 and the transverse struts 2 and 3 constitute the front structural elements of greatest resistance, whilst the tunnel 4 and the crosspiece 5 constitute the structural elements of greatest resistance at the floor level of the body.

A reinforcing structural element according to the invention interconnects the said front structural elements and the said floor-level structural elements, acting as a peak load-transmitting strut.

Figure 2:
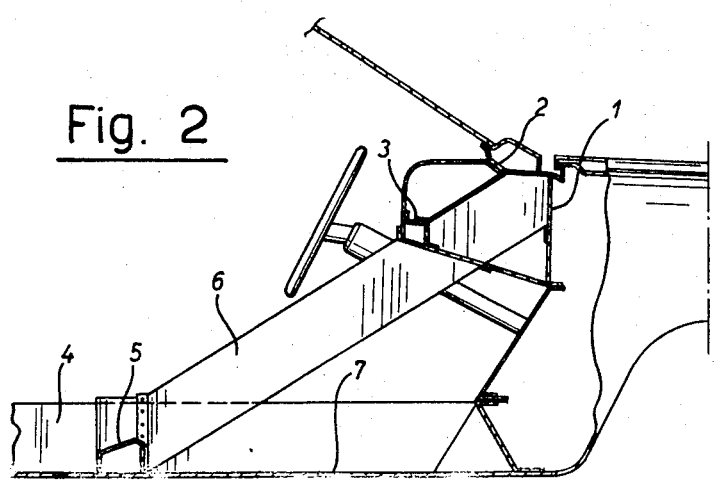
FIG. 2 is a diagrammatic longitudinal section taken on line II—II of FIG. 1.

In the embodiment illustrated diagrammatically in FIGS. 1 and 2, the reinforcing structural element is indicated by numeral 6 and comprises a box-section beam which acts as a strut and which extends between the front transverse struts 2, 3 and the crosspiece 5 on the floor, the strut element 6 being therefore inclined to the horizontal.

In the cabin of a truck the strut element 6 may be braced at its rear end against the rear wall of the cabin and may therefore extend substantially horizontally.

Figure 3:
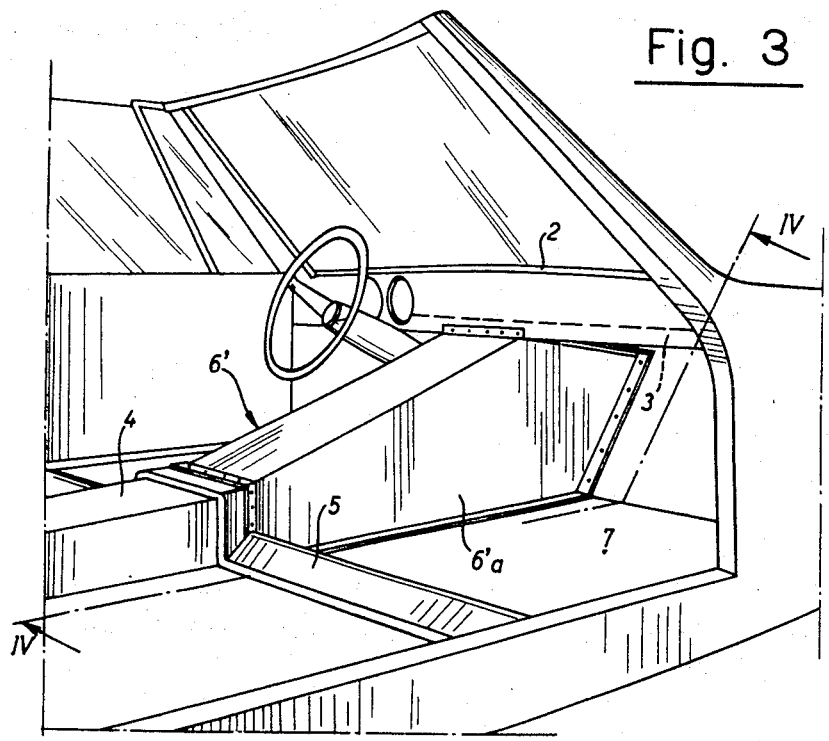
FIG. 3 is a perspective view illustrating a second embodiment of the invention.
Figure 4:
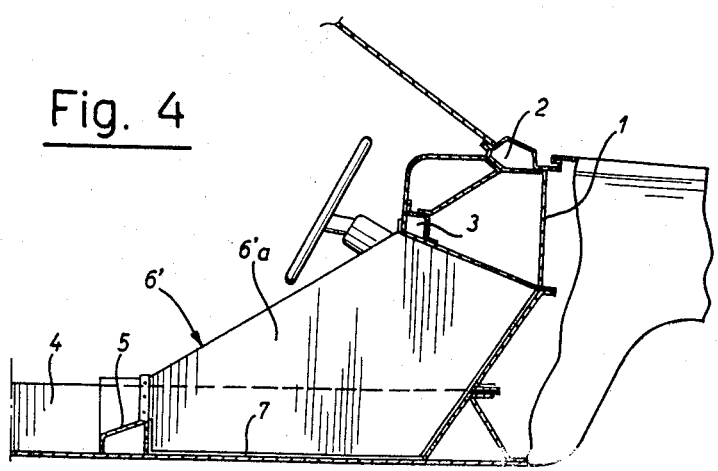
FIG. 4 is a longitudinal section taken on line IV—IV of FIG. 3.

In the embodiment shown in FIGS. 3 and 4 the reinforcing structural element 6' interconnects the front structural elements 1, 2, 3 and the floor-level structural elements 4, 5, with an inclination to the horizontal similar to that of the element 6 in the embodiment of FIGS. 1 and 2. The element 6' has, however, a U-shaped cross-sectional profile, including lateral vertical walls 6'a which extend as far as the floor 7 of the body, spanning the front end of the tunnel 4. In this case the element 6' constitutes in effect a longitudinal partition interconnecting the front structural elements and the floor-level elements. A similar arrangement may be employed in the cabins of trucks.

Figure 5:
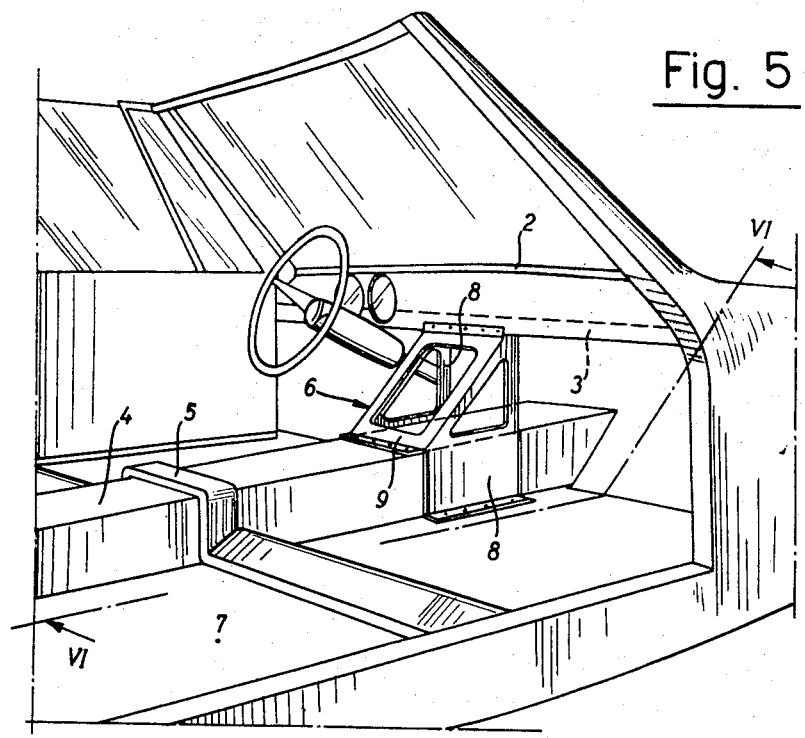
FIG. 5 is a perspective view illustrating a further embodiment of the invention.
Figure 6:
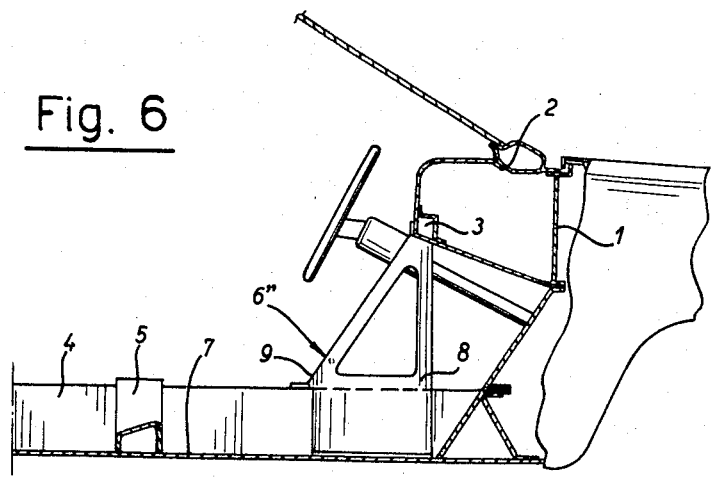
FIG. 6 is a longitudinal section on line VI—VI of FIG. 5.

FIGS. 5 and 6 illustrate diagrammatically a third embodiment in which, with a view to reducing its overall bulk, the structural element 6'' is reduced in length and has a substantially prismatic shape. The element 6'' has two lateral substantially vertical wings 8, of approximately trapezoidal shape, interconnecting the lateral walls of the tunnel 4 with the lower part of the transverse strut 3 of the instrument panel. The element 6'' further has an inclined central plate 9 which interconnects the top wall of the tunnel 4 and the vertical or rear part of the strut 3. The lateral wings 8 and the inclined central plate 9 may be formed of solid plates or may be lightened by apertures, as shown in FIGS. 5 and 6. The wings 8 and the plate 9 may alternatively be of composite construction. The result is a lightweight structural element, of low cost both as regards construction and installation, which is highly effective for the purpose of ensuring an adequate survival space in the event of a frontal collision.

In the course of many destructive tests carried out both on "catapulted" vehicles and on radio-controlled cars it has been shown that the reinforcing structural element of the invention is highly effective in reducing the deformation of the interior of a vehicle body subjected to a frontal collision.

In each embodiment described the reinforcing structural element does not limit appreciably the space normally available to occupants of the body interior, nor does it obstruct or encumber the entry and exit openings of the body.

It will be appreciated that details of construction of practical embodiments of the invention may differ widely from those specifically described and illustrated herein, without nevertheless departing from the scope of this invention.

I claim:

1. A vehicle body having an interior space defined at least in part by a floor, a forward transverse bulkhead and a windshield, said vehicle having reinforcing means comprising a first transverse structural element incorporated in said bulkhead adjacent said windshield, a second transverse structural element incorporated said floor and spaced rearwardly from said bulkhead, a central longitudinal structural element incorporated in said floor and extending at least between said second structural element and said bulkhead, and an inclined load transmitting reinforcing element extending longitudinally centrally of the body and interconnecting said first and second transverse structural elements in said bulkhead and said floor.

2. A vehicle body as set forth in claim 1 wherein said reinforcing element is comprised of a tubular beam.

3. A vehicle body as set forth in claim 1 wherein said reinforcing element is comprised of a longitudinal partition having a U-shaped cross-section having lateral vertical walls which extend to and which are secured to said floor.

* * * * *